(12) United States Patent
Kim et al.

(10) Patent No.: US 12,298,883 B2
(45) Date of Patent: May 13, 2025

(54) DATA LOGGER FOR PROCESSING LOGISTICS-RELATED INFORMATION AND COLD CONTAINER INCLUDING THE SAME

(71) Applicant: 3ALogics Inc., Gyeonggi-do (KR)

(72) Inventors: Sung Wan Kim, Gyeonggi-do (KR);
Pyeong Han Lee, Gyeonggi-do (KR);
Kwang Beom Park, Gyeonggi-do (KR); Sung Hun Chun, Gyeonggi-do (KR); Chang Ho Ryu, Gyeonggi-do (KR)

(73) Assignee: 3ALogics Inc., Gyeonggi-do (KR)

( * ) Notice: Subject to any disclaimer, the term of this patent is extended or adjusted under 35 U.S.C. 154(b) by 397 days.

(21) Appl. No.: 17/748,053

(22) Filed: May 19, 2022

(65) Prior Publication Data

US 2023/0115842 A1 Apr. 13, 2023

(30) Foreign Application Priority Data

Oct. 7, 2021 (KR) ........................ 10-2021-0132786

(51) Int. Cl.
*G06F 11/34* (2006.01)
*G01D 9/00* (2006.01)
(Continued)

(52) U.S. Cl.
CPC ......... *G06F 11/3476* (2013.01); *G01D 9/007* (2021.05); *G01K 1/022* (2013.01);
(Continued)

(58) Field of Classification Search
CPC .... G06F 11/3476; G01D 9/007; G01K 1/022; G01K 1/024; G06Q 10/0832
See application file for complete search history.

(56) References Cited

U.S. PATENT DOCUMENTS

2003/0179809 A1* 9/2003 Nakagawa ............. G01K 1/022
374/208
2014/0266688 A1* 9/2014 Hruska .................... H04Q 9/00
340/539.1
(Continued)

FOREIGN PATENT DOCUMENTS

EP 3109126 A1 * 12/2016 ............. B61L 23/04
JP 2004217326 A * 8/2004
(Continued)

*Primary Examiner* — Natalie Huls
*Assistant Examiner* — Nyla Gavia

(57) ABSTRACT

Provided is a data logger. A data logger includes a sensor configured to sense a change in a gravitational acceleration of the data logger and a change in a rotation angle of the data logger, and generate a sensing signal, a communication module configured to receive configuration information including a sensing period and threshold values of the data logger from a portable reader, and a microprocessor unit configured to receive the sensing signal from the sensor, receive the sensing period and the threshold values from the communication module, generate sensing values corresponding to the sensing signal, compare the sensing values with the threshold values, determine whether an abnormal state occurs in the data logger according to a result of the comparison, generate and transmit to a server normal log information at each of the sensing period when the abnormal (Continued)

state does not occur in the data logger, and generate and transmit to the server abnormal log information whenever the abnormal state occurs regardless of the sensing period.

17 Claims, 13 Drawing Sheets

(51) Int. Cl.
    *G01K 1/022*     (2021.01)
    *G01K 1/024*     (2021.01)
    *G01P 15/00*     (2006.01)
    *G06F 11/07*     (2006.01)
    *G06F 17/40*     (2006.01)
    *G06Q 10/0832*     (2023.01)
    *G06Q 10/0833*     (2023.01)
(52) U.S. Cl.
    CPC .......... *G01K 1/024* (2013.01); *G06F 11/0754* (2013.01); *G06F 11/0784* (2013.01); *G06F 17/40* (2013.01); *G06Q 10/0832* (2013.01); *G01P 15/00* (2013.01); *G06F 2201/81* (2013.01); *G06Q 10/0833* (2013.01)

(56) References Cited

U.S. PATENT DOCUMENTS

| | | | |
|---|---|---|---|
| 2019/0303862 A1* | 10/2019 | Bollinger | G06F 3/0482 |
| 2020/0019927 A1* | 1/2020 | Muirhead | H04W 4/35 |
| 2021/0182641 A1* | 6/2021 | Juhala | G06K 19/06131 |
| 2023/0046713 A1* | 2/2023 | Daniol | G16H 40/20 |
| 2023/0096737 A1* | 3/2023 | Kim | H04W 4/80 |
| | | | 340/691.8 |
| 2023/0109592 A1* | 4/2023 | Rokhsaz | G06K 7/10118 |
| | | | 709/223 |

FOREIGN PATENT DOCUMENTS

| | | | |
|---|---|---|---|
| JP | 5786667 B2 * | 9/2015 | |
| JP | 2016161294 A * | 9/2016 | |
| JP | 2020523257 A * | 8/2020 | |
| KR | 10-2005-0070729 | 7/2005 | |
| KR | 10-2017-0020155 | 2/2017 | |
| KR | 10-2018-0058194 | 5/2018 | |
| KR | 10-2299328 | 9/2021 | |

* cited by examiner 425-1

| Unique number | Owner information |
|---|---|
| Date: 2021.09.02<br>Start time:<br>Sensing period: | Event type |
| Current temperature: T1/T2 | Maximum temperature: T3/T4<br>Minimum temperature: T5/T6 |
| Battery | 2.8V/78% |

FIG. 13

DATA LOGGER FOR PROCESSING LOGISTICS-RELATED INFORMATION AND COLD CONTAINER INCLUDING THE SAME

RELATED APPLICATION

This application claims the benefit of priority of Korea Patent Application No. 10-2021-0132786 filed on Oct. 7, 2021, the contents of which are incorporated by reference as if fully set forth herein in their entirety.

FIELD AND BACKGROUND OF THE INVENTION

One or more example embodiments relate to a data logger which processes logistics-related information, and more particularly, to a data logger capable of determining whether a state of the data logger is a normal state or an abnormal state according to a result of comparison of threshold values and output values of a sensor which senses an acceleration and a rotation angle of the data logger and generating log information corresponding to a result of the determination, and a method of providing a logistics information service using the data logger.

Delivery information of goods provided by a logistics company is linked to a website of the logistics company to provide a customer with loading time, unloading time, address, phone number, etc. by an integrated logistics center, a regional logistics center, and a regional sales office where the goods are received and released, as text or message information (SMS), or a method in which the customer directly checks the delivery information on the website of the logistics company is mainly used.

However, the current location of the goods purchased by the customer is identified only when the goods arrive at a logistics center (for example, the integrated logistics center or regional logistics center) or each regional sales office and are loaded and unloaded, and it is difficult to grasp the current location in real time while a logistics vehicle is moving.

In addition, due to a short shelf life of fresh food, high logistics costs may be incurred due to inventory and disposal, establishment of a low-temperature logistics center and refrigerated vehicle infrastructure to maintain freshness, and additional costs for packaging materials.

While consumers have been reluctant to purchase fresh food online due to difficulties in checking freshness and delay in delivery, a cold chain system (e.g., a system that manages the goods at a low temperature from receiving to delivery) has been introduced in fresh food delivery services since 2015.

PRIOR ART DOCUMENT

Patent Document (Patent Document 1) Korean Patent Application Publication No. 10-2005-0070729 (Published on Jul. 7, 2005)
(Patent Document 2) Korean Patent Application Publication No. 10-2017-0020155 (Published on Feb. 22, 2017)
(Patent Document 3) Korean Patent Application Publication No. 10-2018-0058194 (Published on May 31, 2018)
(Patent Document 4) Korean Patent No. 10-2299328 (Published on Sep. 8, 2021)

SUMMARY OF THE INVENTION

Example embodiments provide a data logger capable of determining whether a state of the data logger is a normal state or an abnormal state according to a result of comparison of threshold values and output values of a sensor which senses an acceleration and a rotation angle of the data logger and generating log information corresponding to a result of the determination, and a method of providing a logistics information service using the data logger.

According to an aspect, there is provided a data logger including a sensor configured to sense a change in a gravitational acceleration of the data logger and a change in a rotation angle of the data logger, and generate a sensing signal, a communication module configured to receive configuration information including a sensing period and threshold values of the data logger from a portable reader, and a microprocessor unit configured to receive the sensing signal from the sensor, receive the sensing period and the threshold values from the communication module, generate sensing values corresponding to the sensing signal, compare the sensing values with the threshold values, determine whether an abnormal state occurs in the data logger according to a result of the comparison, generate and transmit to a server normal log information at each of the sensing period when the abnormal state does not occur in the data logger, and generate and transmit to the server abnormal log information whenever the abnormal state occurs regardless of the sensing period.

The microprocessor unit may be configured to determine that the data logger is in a normal state when each of the sensing values is less than each of the threshold values, and determine that the data logger is in the abnormal state when at least one of the sensing values is greater than at least one of the threshold values.

The data logger may further include a temperature sensor connected to the microprocessor unit, a memory device connected to the microprocessor unit and configured to store an electronic product code, and a modem and GPS module connected to the microprocessor unit, and configured to receive GPS signals and communicate with the server, wherein, at each of the sensing period in the normal state, the microprocessor unit may be configured to generate first temperature information using the temperature sensor, generate first location information using the GPS signals, read the electronic product code stored in the memory device, generate first transmission time information at which the normal log information is transmitted to the server, and generate and transmit to the modem and GPS module, the normal log information including the electronic product code, the first temperature information, the first location information, and the first transmission time information.

Regardless of the sensing period whenever the abnormal state occurs, the microprocessor unit may be configured to generate second temperature information using the temperature sensor, generate second location information using the GPS signals, read the electronic product code stored in the memory device, generate second transmission time information at which the abnormal log information is transmitted to the server, and generate and transmit to the modem and GPS module, the abnormal log information including the electronic product code, the second temperature information, the second location information, and the second transmission time information.

The communication module may be configured to receive a request signal from the portable reader, and the microprocessor unit may be configured to generate third temperature information using the temperature sensor in response to the request signal, read the electronic product code from the memory device in response to the request signal, and transmit the third temperature information and the electronic product code to the communication module in response to the request signal.

The data logger may further include an electronic paper display device connected to the microprocessor unit, wherein the microprocessor unit may be configured to display time at which the data logger starts to operate, the sensing period, and a current temperature, a maximum temperature, and a minimum temperature sensed by the temperature sensor on the electronic paper display device. The maximum temperature may be the highest temperature among first temperatures sensed by the temperature sensor at each of the sensing period and second temperatures sensed by the temperature sensor whenever the abnormal state occurs, and the minimum temperature may be the lowest temperature among the first temperatures and the second temperatures.

According to another aspect, there is provided a method of operating a data logger including sensing a change in a gravitational acceleration of the data logger and a change in a rotation angle of the data logger and generating a sensing signal, by the data logger, receiving, by the data logger, configuration information including a sensing period and threshold values of the data logger from a portable reader, receiving the sensing signal and receiving the configuration information including the sensing period and the threshold values, by the data logger, generating sensing values corresponding to the sensing signal, comparing the sensing values with the threshold values, and determining whether an abnormal state occurs in the data logger according to a result of the comparison, by the data logger, generating and transmitting to the server, by the data logger, normal log information at each of the sensing period when the abnormal state does not occur in the data logger, and when the abnormal state occurs in the data logger, generating and transmitting to the server, by the data logger, abnormal log information whenever the abnormal state occurs regardless of the sensing period.

According to another aspect, there is provided a cold container including a container body, and a data logger including an out-body equipped on an outside of the container body and an in-body equipped on an inside of the container body, wherein the out-body includes a sensor configured to sense a change in a gravitational acceleration of the data logger and a change in a rotation angle of the data logger, and generate a sensing signal, a communication module configured to receive configuration information including a sensing period and threshold values of the data logger from a portable reader, and a microprocessor unit. The microprocessor unit is configured to receive the sensing signal from the sensor, receive the sensing period and the threshold values from the communication module, generate sensing values corresponding to the sensing signal, compare the sensing values with the threshold values to determine whether an abnormal state occurs in the data logger according to a result of the comparison, generate and transmit to the server, normal log information at each of the sensing period when the abnormal state does not occur in the data logger, and when the abnormal state occurs in the data logger, generate and transmit to the server, abnormal log information whenever the abnormal state occurs regardless of the sensing period.

According to another aspect, there is provided an application stored in a non-transitory storage medium of a portable reader configured to control operation of a data logger equipped in a cold container, wherein the application performs activating an information acquisition device of the portable reader in response to a first event selection signal, from the information acquisition device configured to acquire waybill information from a waybill for goods attached to the cold container, receiving the waybill information, receiving a goods deposit type indicating whether the goods stored in the cold container are to be stored refrigerated or frozen, transmitting a first request signal to the data logger through a first communication device of the portable reader, when the data logger measures a first internal temperature of the cold container in response to the first request signal, receiving first temperature information corresponding to the first internal temperature and an electronic product code of the cold container from the data logger, and in response to a first transmission request, generating and transmitting first event log information including the waybill information, the goods deposit type, the electronic product code, the first temperature information, and first location information of the portable reader to a server through a second communication device of the portable reader, wherein the first event log information further includes first time information indicating time at which the first event log information is transmitted to the server.

According to another aspect, there is provided a method of providing logistics information using a data logger equipped in a cold container for storing goods, a first portable reader, a second portable reader, and a server, including receiving, by the data logger, configuration information including a start time and a sensing period of the data logger, and threshold values of a gravitational acceleration and a rotation angle for the data logger from the first portable reader, starting, by the data logger, operation from the start time, comparing output values of a sensor of the data logger with the threshold values, and determining whether an abnormal state occurs in the data logger according to a result of the comparison, generating and transmitting to the server, by the data logger, normal log information at each of the sensing period when the abnormal state does not occur in the data logger, and generating and transmitting to the server, by the data logger, abnormal log information whenever the abnormal state occurs regardless of the sensing period.

Additional aspects of example embodiments will be set forth in part in the description which follows and, in part, will be apparent from the description, or may be learned by practice of the disclosure.

According to example embodiments, a data logger for processing logistics-related information may determine whether a state of the data logger is a normal state or an abnormal state according to a result of comparison of threshold values and output values of a sensor which senses an acceleration and a rotation angle of the data logger and generate log information corresponding to a result of the determination.

BRIEF DESCRIPTION OF THE SEVERAL VIEWS OF THE DRAWINGS

These and/or other aspects, features, and advantages of the invention will become apparent and more readily appreciated from the following description of example embodiments, taken in conjunction with the accompanying drawings of which:

FIG. 13 is a diagram illustrating an example embodiment of information displayed on an electronic paper display of the data logger illustrated in FIG. 1.

DESCRIPTION OF SPECIFIC EMBODIMENTS OF THE INVENTION

Logistics means physical distribution. Logistics refers to activities of properly moving or locating specific goods or services. A delivery service refers to a service that delivers goods or products from one place to another. Delivery services are carried out by workers and transportation means.

Figure 1:
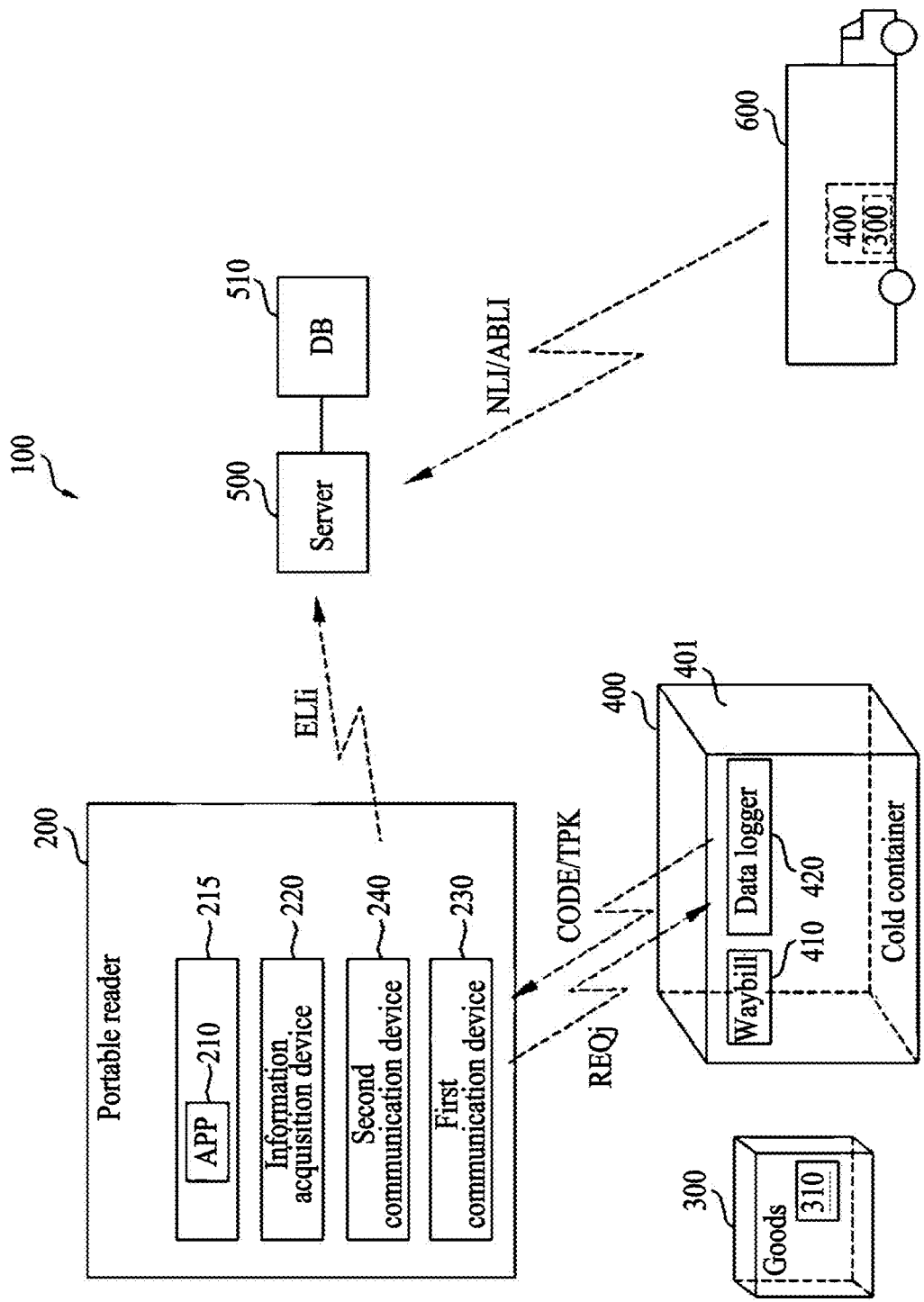
FIG. 1 is a block diagram illustrating a logistics system including a cold container equipped with a data logger according to an example embodiment.

FIG. 1 is a block diagram illustrating a logistics system including a cold container equipped with a data logger according to an example embodiment. Referring to FIG. 1, a logistics system 100 for providing delivery service and logistics information includes a portable reader 200, goods (also referred to as 'fresh food') 300, a cold container 400 used to transport the goods 300 contained therein, a server 500, a database 510, and a transportation means 600.

The logistics system 100 refers to a system that ensures freshness and quality of the goods 300 by keeping the temperature of a distribution process low in distributing the goods 300 for which temperature management is required, for example, a cold chain or a cold chain system.

Figure 3:
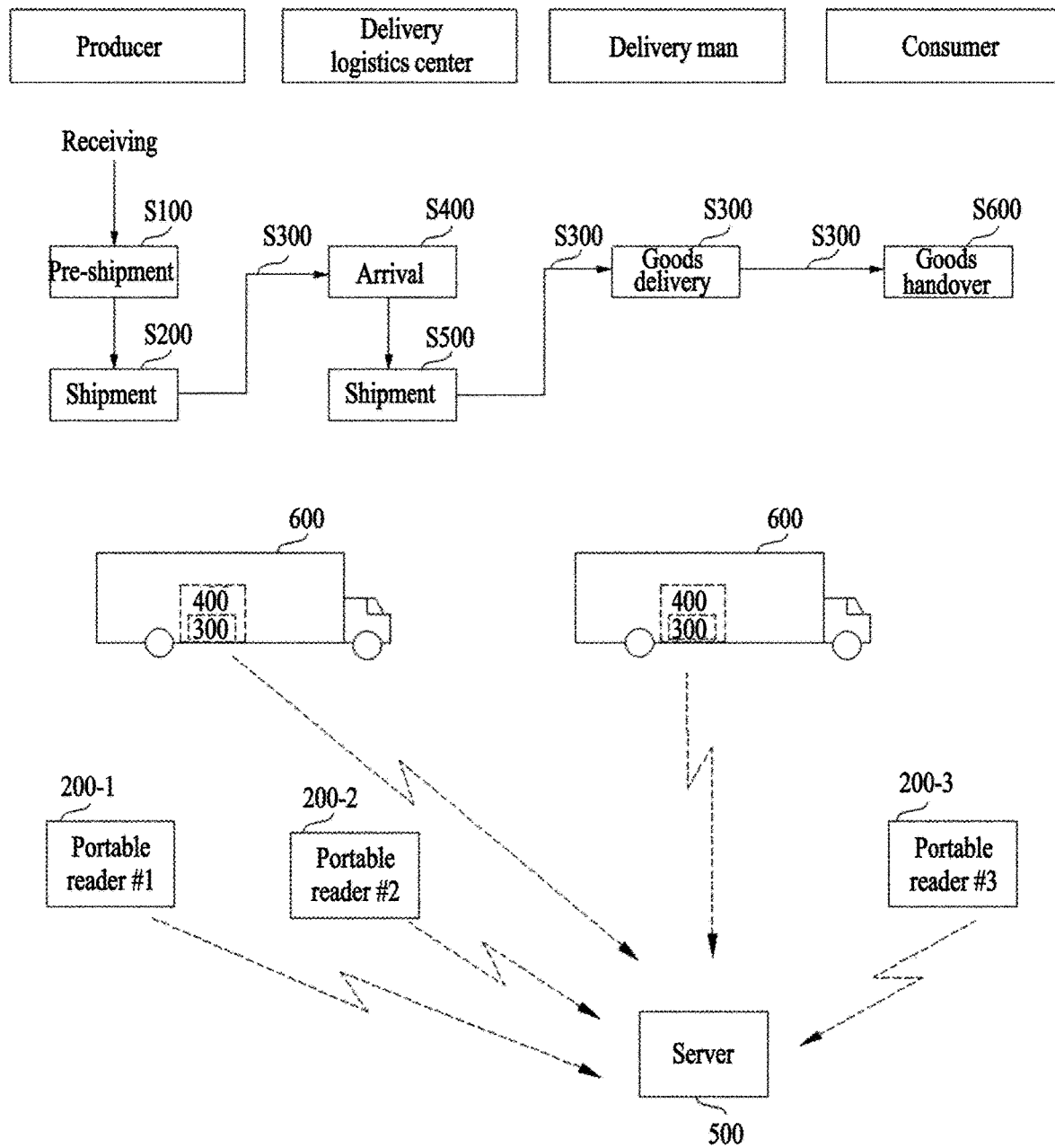
FIG. 3 is a diagram illustrating a process in which goods are delivered from a producer to a consumer through the logistics system illustrated in FIG. 1.

The portable reader 200 collectively refers to portable readers 200, 200-1, 200-2, and 200-3 used by an worker in each operation of logistics illustrated in FIGS. 1 and 3. The portable reader 200 may refer to a communication terminal.

The portable reader 200 may be a mobile device (e.g., a smartphone) which communicates with a near field communication (NFC) module 443 of a data logger 420, and may be a mobile device (e.g., a PDA (personal digital assistant) or an EDA (enterprise digital assistant) used by a retailer) which communicates with a radio-frequency identification (RFID) module 447 of the data logger 420.

The data logger 420 refers to a data processing device which processes logistics-related information (e.g., temperature information and/or log information (NLI, ABLI), etc.) described herein. The data logger 420 performs a function of a dual-band wireless communication device.

The portable reader 200 includes a processor 215 which executes an application 210, an information acquisition device 220, a first communication device 230, and a second communication device 240.

Figure 11:
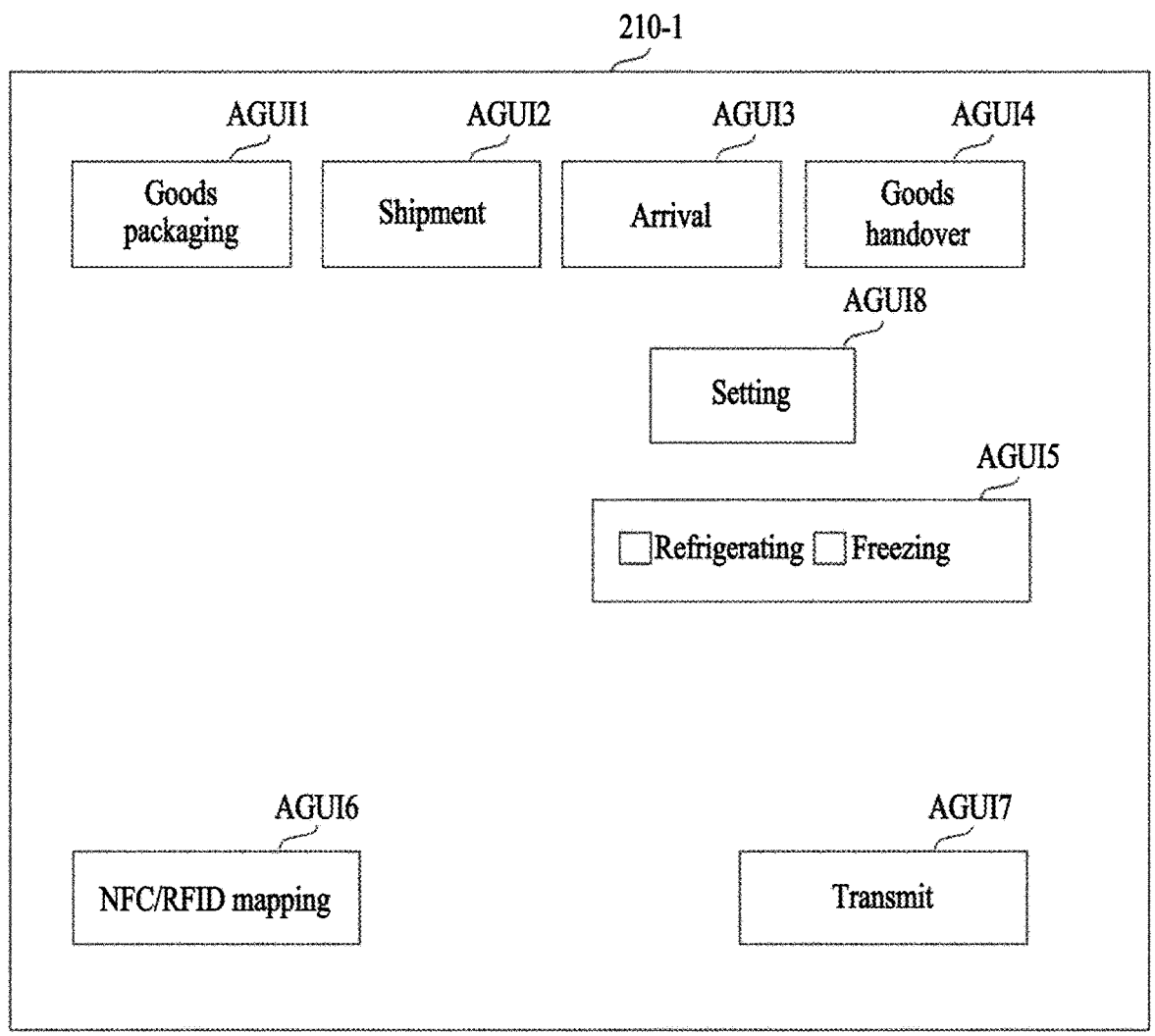
FIG. 11 is a diagram illustrating an example embodiment of a graphical user interface of an application according to an example embodiment.
Figure 12:
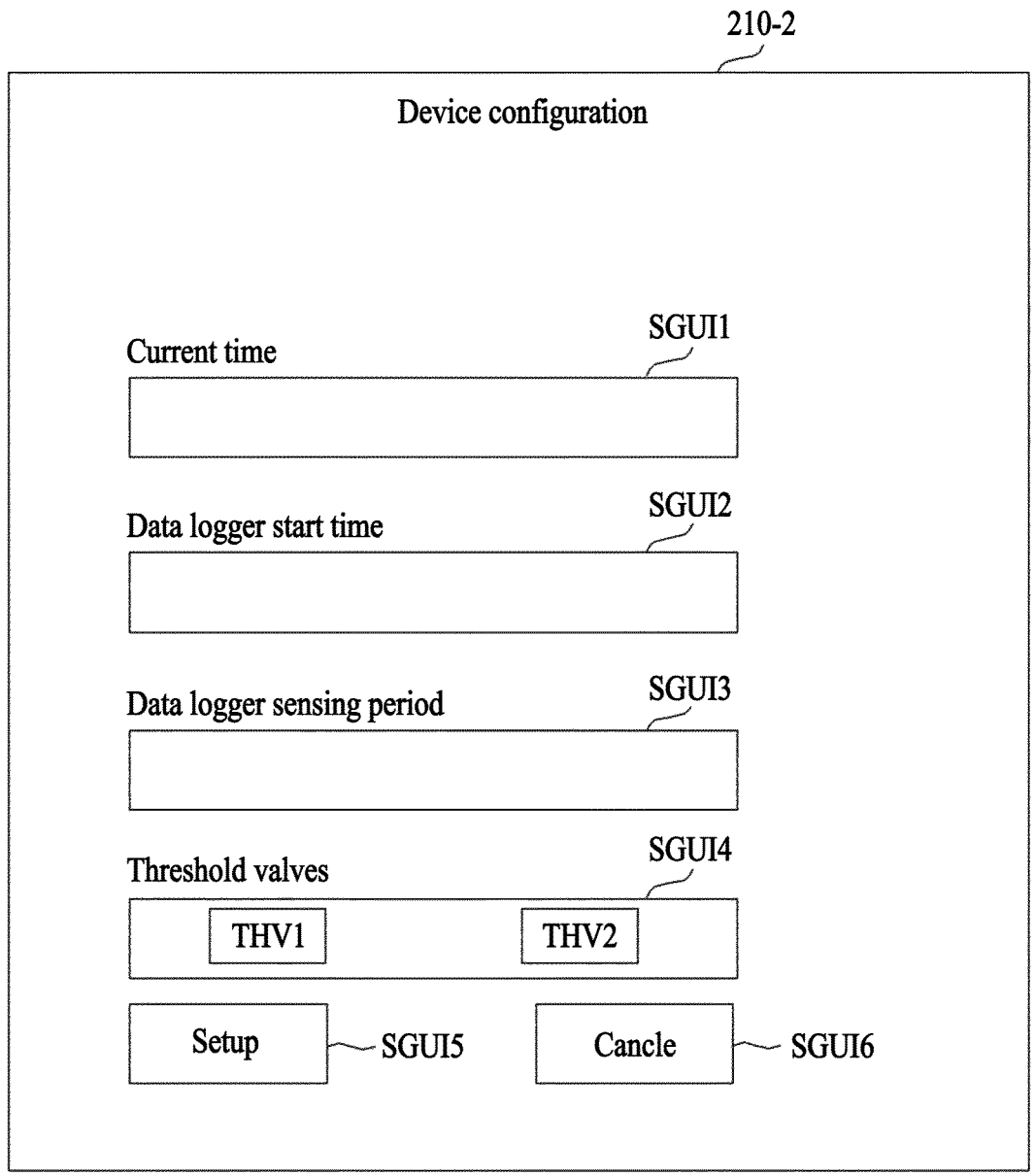
FIG. 12 is a diagram illustrating an example embodiment of a graphical user interface of an application for setting configuration information in the data logger illustrated in FIG. 1 according to an example embodiment.

The application 210 performs provision of each graphical user interface (AGUI1~AGUI4) through which the worker at each operation may select each event (e.g., goods packaging, shipment, arrival, goods handover, etc.) illustrated in FIG. 11, control of activation of the information acquisition device 220, provision of a GUI (AGI5) to select a goods deposit type (e.g., refrigerated or frozen), provision of NFC/RFID mapping GUI (AGUI6), provision of transmission GUI (AGUI7), provision of setting GUI (AGUI8), and provision of GUIs (SGUI1~SGUI6) for device setting (e.g., data logger setting) illustrated in FIG. 12.

The application 210 combined with hardware to perform the provided functions exemplified above is stored in a computer-readable storage medium and executed by the processor 215.

For example, when the portable reader 200 includes a display device which displays a first page 210-1 and a second page 210-2 under the control of the application 210, it is assumed that when the setting GUI (AGUI8) of the first page 210-1 of FIG. 11 is selected, the second page 210-2 including the GUIs (SGUI1~SGUI6) of FIG. 12 is displayed on the display device.

The worker of a producer operation of FIG. 3 may set configuration information (STT, SP, and THV) to be described with reference to FIG. 5 to the data logger 420 using the application 210 executed in a first portable terminal 210-1.

The processor 215 controls operations of each of the devices 220, 230, and 240 according to the control of the application 210. The portable reader 200 may further include a storage medium (also referred to as a 'recording medium') for storing the application 210 executed by the processor 215 (for example, a memory device accessible by the processor 215).

The information acquisition device 220 may be a camera or a barcode scanner, and the camera or the barcode scanner may acquire goods information about the goods 300 from a barcode 310 attached to the goods 300, and the acquired goods information may be transmitted to the application 210.

The first communication device 230 includes an NFC transceiver which communicates with an NFC module 443 included in the data logger 420 and/or an RFID transceiver which communicates with an RFID module 447 included in the data logger 420. The first communication device 230 transmits a request signal (REQj, where j is a natural number) to the NFC module 443 or the RFID module 447, and receives an electronic product code (EPC) CODE and/or temperature information (TPk, where k is a natural number) from the NFC module 443 or the RFID module 447.

The second communication device 240 is a transceiver capable of sending or receiving information to or from the server 500 through a mobile communication network, the Internet, or a WiFi communication network. For example, the second communication device 240 may transmit the event log information (ELIi, where i is a natural number) generated in operations S122, S224, S418, S518, and S618 to the server 500.

Because the goods 300 are sensitive to temperature and easily perishable, it collectively refers to fresh food such as vegetables, fruits, meat, or fish that are distributed in a fresh state. The barcode 310 for storing unique information of the goods 300 may be attached to the goods 300 or the packaging of the goods 300. Examples of the barcode 310 include one-dimensional barcodes or two-dimensional barcodes.

The cold container 400 refers to a storage device used to distribute the goods 300 stored therein while maintaining the goods 300 at a low temperature. The cold container 400 includes a container body 401 and the data logger 420.

The data logger 420 which stores the configuration information and generates log information (NLI and ABLI) according to the configuration information includes an out-body 420-1 equipped on the outside of the container body 401 and an in-body 420-2 equipped on the inside the container body 401. The container body 401 includes at least one of a refrigerator and a freezer that operate independently of each other.

A waybill 410 may be attached to the outside of the cold container 400 equipped with the data logger 420. The waybill 410 may refer to an instruction for instructing shipment (or release) of the goods 300. The waybill 410 may be a one-dimensional barcode or a two-dimensional barcode including information of the sender (e.g., name, phone number, and address), information of the recipient (e.g., name, phone number, and address), information of contents (e.g., goods 300), a unique number, and the like.

According to example embodiments, the barcode 310 and/or the waybill 410 may be replaced with an NFC tag or an RFID tag. In this case, information stored in the NFC tag or the RFID tag may be read using the first communication device 230 of the portable reader 200.

The function and structure of the data logger 420 will be described in detail with reference to FIG. 2.

The server 500 may transmit or receive information to or from the portable reader 200, and may receive log information (NLI and ABLI) generated in operations S300, S316, and S322 from the data logger 420.

The transportation means 600 refers to a vehicle used to transport the cold container 400 in which the goods 300 are stored.

Figure 2:
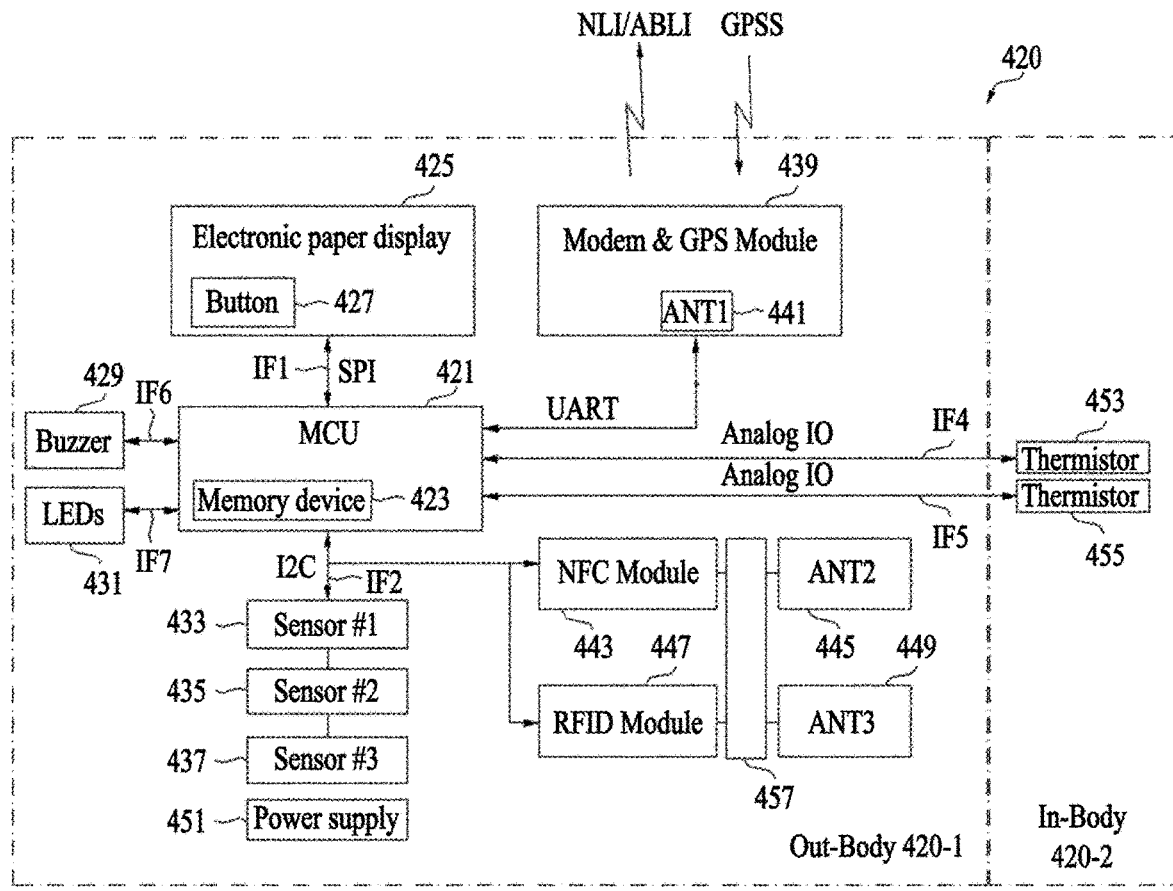
FIG. 2 is a block diagram illustrating the data logger illustrated in FIG. 1.

FIG. 2 is a block diagram illustrating the data logger illustrated in FIG. 1.

Figure 6:
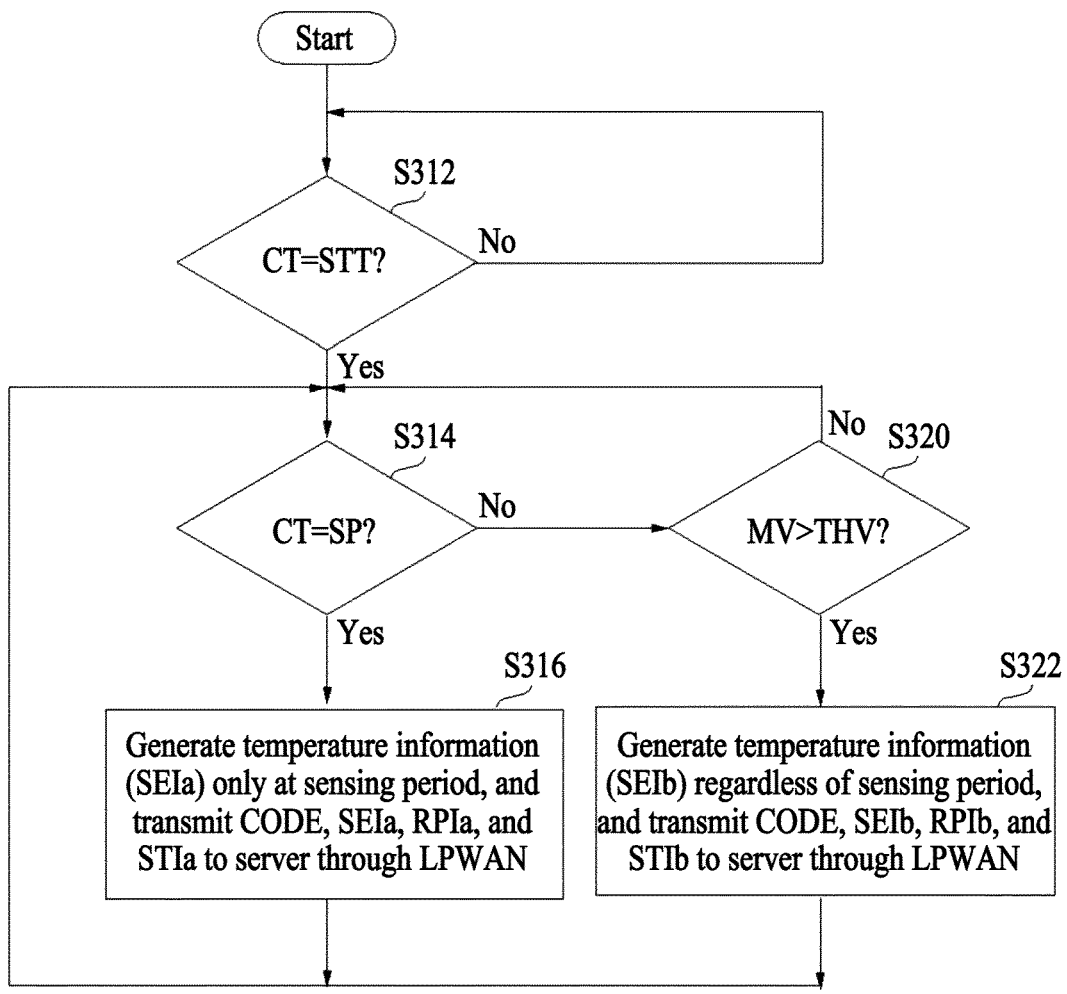
FIG. 6 is a flowchart illustrating a process in which the data logger illustrated in FIG. 1 transmits log information to a server.

Referring to FIGS. 1, 2, and 6, the data logger 420 which transmits normal log information (NLI) generated in operation S316 of FIG. 6 or abnormal log information (ABLI) generated in operation S322 to the server 500 includes the out-body (or main device) 420-1 equipped on the outside of the container body 401 and the in-body (or sub device) 420-2 equipped on the inside of the container body 401.

The out-body 420-1 includes a main controller unit (MCU) 421, a memory device 423, an electronic paper display 425, a button 427, a buzzer 429, at least one light source 431, at least one sensor 433, 435, and 437, a modem and GPS module 439, a first antenna 441, an NFC module 443, a second antenna 445, an RFID module 447, a third antenna 449, and a power supply (also referred to as a 'battery' 451), and the in-body 420-2 connected to the MCU 421 of the out-body 420-1 through wires includes at least one temperature sensor (for example, thermistor) 453 and 455. The communication module includes an NFC module 443 and an RFID module 447.

For example, when the container body 401 includes a first compartment (e.g., a freezer) and a second compartment (e.g., a refrigerator), the first temperature sensor 453 is equipped in the first compartment and the second temperature sensor 455 is equipped in the second compartment.

The MCU 421 may control the overall operation of the data logger 420 and include a BLE module for BLE (Bluetooth low energy) communication. The BLE module may transmit or receive information with the portable reader 200, the server 500, or other communication devices according to a protocol defined in the Bluetooth specification. Here, information means a signal or data.

The MCU 421 may receive the configuration information (STT, SP, and THV) transmitted through the first communication device 230 after being set by the application 210 through the NFC module 443 or the RFID module 447, and may store the configuration information (STT, SP, and THV) in the memory device 423. The memory device 423 may be an EEPROM (electrically erasable programmable read-only memory). Although the memory device 423 is illustrated inside the MCU 421 in FIG. 2, the memory device 423 may be disposed outside the MCU 421.

The data logger 420 includes a sensor 437, a communication module 443 or 447, and the microprocessor unit 421, and the sensor 437 senses a change in a gravitational acceleration of the data logger 420 and a change in a rotation angle of the data logger 420, and generates a sensing signal.

The communication module 443 or 447 receives the configuration information (STT, SP, and THV) including a sensing period SP of the data logger 420 and threshold values THV1 and THV2 from the portable reader 200.

The microprocessor unit 421 receives the sensing signal from the sensor 437, receives the sensing period (SP) and the threshold values (THV1 and THV2) from the communication module 443 or 447, generates the sensing values (MV) corresponding to the sensing signal, compares the sensing values (MV) and threshold values (THV1 and THV2), determines whether an abnormal state occurs in the data logger 420 according to a result of the comparison, generates and transmits to the server 500 the normal log information (NLI) at each of the sensing period (SP) when the abnormal state does not occur in the data logger 430, and generates and transmits to the server 500 the abnormal log information (ABLI) whenever the abnormal state occurs regardless of the sensing period (SP).

The microprocessor unit 421 determines that the data logger 420 is in a normal state when each of the sensing values (MV) is less than each of the threshold values (THV1 and THV2), and determines that the data logger 420 is in the abnormal state when at least one of the sensing values (MV) is greater than at least one of the threshold values (THV1 and THV2).

The electronic paper display 425 may display the information 425-1 illustrated in FIG. 13 according to the operation of the button 427, and the information 425-1 may be stored in the memory device 423 under the control of the MCU 421. For example, the electronic paper display 425 includes an electronic paper panel and a driver IC which drives the electronic paper panel under the control of the MCU 421.

The MCU 421 transmits information to the electronic paper display 425 through a first interface (IF1, for example, serial peripheral interface (SPI)) and controls the operation of the electronic paper display 425.

The button 427 functions as a menu button for selecting information to be displayed on the electronic paper display 425 or a refresh button for refreshing information displayed on the electronic paper display 425. Although the button 427 is illustrated inside the electronic paper display 425 in FIG. 2, the button 427 may be disposed outside the electronic paper display 425.

The MCU 421 controls the operation of the buzzer 429 using a pulse width modulation (PWM) signal transmitted through the sixth interface (IF6). The MCU 421 determines that the internal temperature of the cold container 400 is out of a set temperature range (e.g., the maximum temperature or the minimum temperature) using the output signal of the temperature sensor 453 and/or 455, and transmits the buzzer control signal corresponding to the PWM signal to the buzzer 429 through the sixth interface (IF6) according to the result of the determination. Accordingly, the worker of the cold container 400 may recognize that the internal temperature of the cold container 400 is out of the set temperature range through the alarm of the buzzer 429. Here, the worker may be a holder of each portable reader 200, 200-1, 200-2, or 200-3.

The MCU 421 controls the operation (e.g., blinking or color change) of the light source 431 through the seventh interface (IF7, for example, general-purpose input/output (GPIO)). For example, the light source 431 may operate in synchronization with the operation of the buzzer 429. The light source 431 may be a light-emitting diode (LED). For example, the light source 431 may notify the worker of the cold container 400 of an abnormal situation (for example, the internal temperature of the cold container 400 is out of the set temperature range) of the cold container 400 while changing the color of the light source 431.

The MCU 421 may determine an abnormal situation based on the output signal of the temperature sensor 453 and/or 455 and push the determination result to the smartphone of the worker.

The first sensor 433 is a temperature sensor for sensing ambient temperature, the second sensor 435 is a humidity sensor for sensing ambient humidity, and the third sensor 437 is a sensor which senses a change in gravitational acceleration and a change in rotation angle. For example, the third sensor 437 may be a gyroscope.

Signals sensed by the sensors 433, 435, and 437 are transmitted to the MCU 421 through a second interface (IF2, for example, an inter-integrated circuit (IC2)).

The modem and GPS module 439 performs a function of a modem and a function of a GPS receiver.

Under the control of the MCU 421, the modem and GPS module 439 transmits the normal log information (NLI) and the abnormal log information (ABLI) to the server 500 through the first antenna 441, or receives GPS signals (GPSS) transmitted from GPS satellites and transmits them to the MCU 421. The MCU 421 generates the normal log information (NLI) or abnormal log information (ABLI) according to the conditions S312, S314, and S320 described with reference to FIG. 6, and uses GPS signals (GPSS) to generate GPS information (RPIa or RPIb) indicating the location of the data logger 420.

The MCU 421 may transmit or receive information (NLI, ABLI, and/or GPSS) to or from the modem and GPS module 439 through a third interface (IF3, for example, a universal asynchronous receiver/transmitter (UART) interface).

Figure 5:
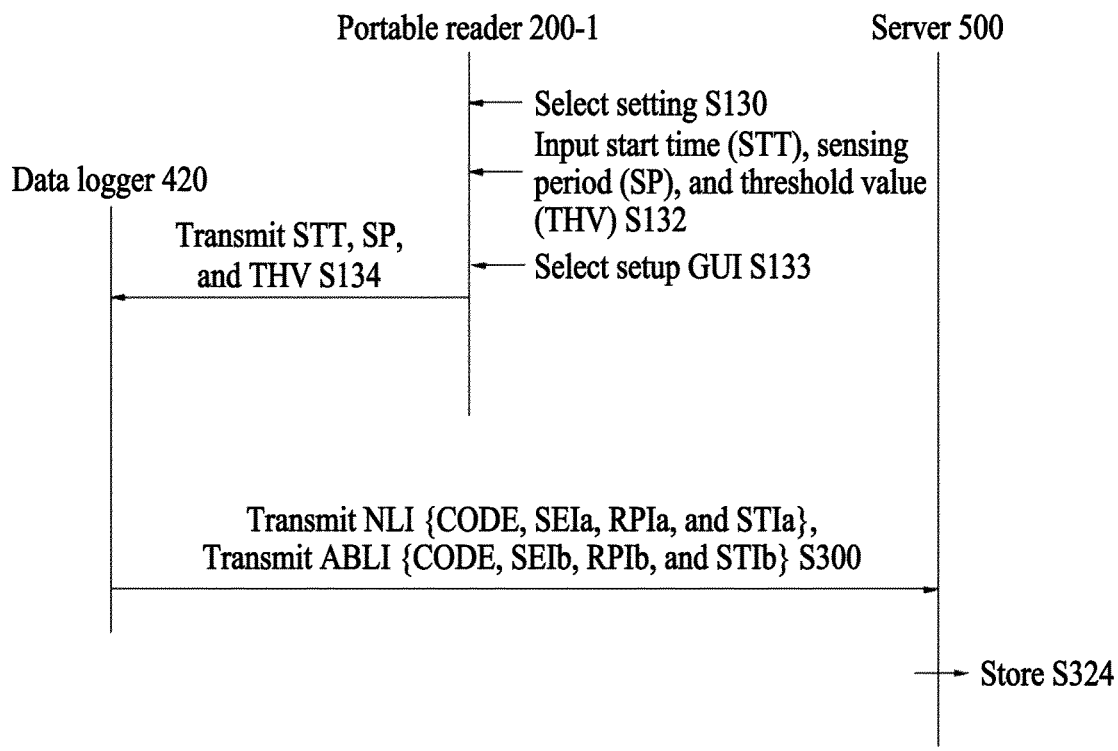
FIG. 5 is a data flow diagram illustrating a process of setting configuration information in the data logger equipped in the cold container in the pre-shipment operation of the producer operation illustrated in FIG. 3.

The modem and GPS module 439 of the data logger 420 equipped in the cold container 400 mounted on the moving transportation means 600 transmits the normal log information (NLI) or the abnormal log information (ABLI) to the server 500 according to operation S300 of FIG. 5. For example, the modem and GPS module 439 transmits the normal log information (NLI) or abnormal log information (ABLI) to the server 500 in real time through a low power wide area network (LPWAN). As the normal log information (NLI) or the abnormal log information (ABLI) is transmitted to the server 500 through the LPWAN, power consumption of the data logger 420 is reduced.

The NFC module 443 may transmit or receive information to or from the NFC transceiver included in the first communication device 230 of the portable reader 200 through the second antenna 445 (also referred to as 'high frequency (HF) antenna' or 'NFC antenna'). The NFC module 443 may include information to be processed by the NFC module 443 or a memory device for storing processed information.

The RFID module 447 may transmit or receive information to or from the RFID transceiver included in the first communication device 230 of the portable reader 200 through the third antenna 449 (also referred to as 'ultra high frequency (UHF) antenna' or 'RFID antenna'). The RFID module 447 may be a UHF RFID module. The RFID module 447 may include information to be processed by the RFID module 447 or a memory device that stores the processed information.

The in-body 453 and 455 of the cold container 400 includes a first temperature sensor 453 for sensing the internal temperature of the freezer and/or a second temperature sensor 455 for sensing the internal temperature of the refrigerator. Each temperature sensor 453 and 455 may be a thermistor temperature sensor. According to example embodiments, each of the temperature sensors 453 and 455 may be replaced with a sensor which senses both temperature and humidity.

The MCU 421 may transmit or receive information to or from the temperature sensor 453 and/or 455 through the analog interface IF4 and/or IF5. The MCU 421 may include an analog-digital converter that converts the analog temperature signal output from the temperature sensor 453 and/or 455 into a digital temperature signal.

According to example embodiments, when the cold container 400 includes only the freezer or when the goods 300 are stored only in the freezer even though both the freezer and the refrigerator are included, the first temperature sensor 453 may be enabled and the second temperature sensor 455 may be disabled according to the control of the MCU 421 or the control of the worker who operates the button 427.

According to example embodiments, when the cold container 400 includes only the freezer or when the goods 300 are stored only in the freezer even if both the freezer and the refrigerator are included, the MCU 421 may receive and process the output signal of the first temperature sensor 453 and ignore the output signal of the second temperature sensor 455 even though received.

According to example embodiments, when the cold container 400 includes only the refrigerator or when the goods 300 are stored only in the refrigerator even if both the freezer and the refrigerator are included, the first temperature sensor 453 may be disabled and the second temperature sensor 455 may be enabled according to the control of the MCU 421 or the control of the worker who operates the button 427.

According to embodiments, when the cold container 400 includes only the refrigerator or when the goods 300 are stored only in the refrigerator even if both the freezer and the refrigerator are included, the MCU 421 may ignore the output signal of the first temperature sensor 453 even though received, and receive and process the output signal of the second temperature sensor 455.

The MCU 421 may include a function of checking the voltage of the power supply 451, and the MCU 421 sensing that the checked voltage is lower than the set voltage may transmit an alarm to the buzzer 429, the light source 431, and/or the smart phone of the worker.

FIG. 3 is a diagram illustrating a process in which goods are delivered from a producer to a consumer through the logistics system illustrated in FIG. 1. The goods 300 produced by the producer is mounted on the transportation means 600 and finally delivered to the consumer through various operations (S100 to S600).

The structure of each of the portable readers 200, 200-1, 200-2, and 200-3 is assumed to be the same, and each of the portable readers 200, 200-1, 200-2, and 200-3 is assumed to have the same application 210 installed.

Figure 4:
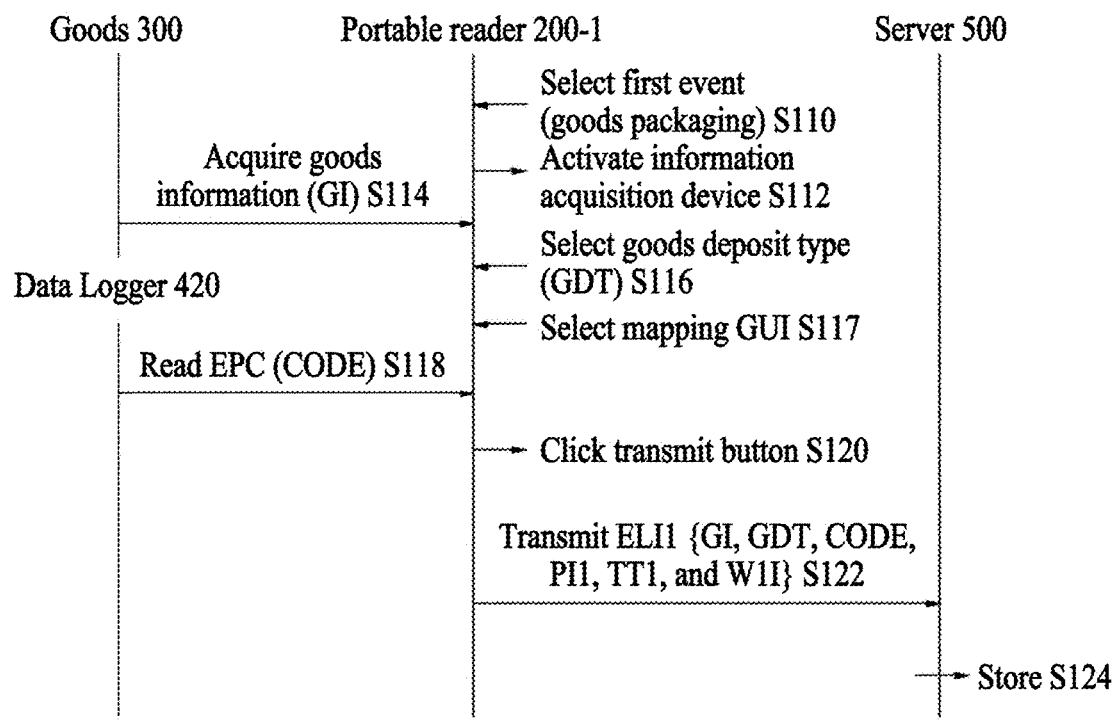
FIG. 4 is a data flow diagram illustrating an operation of the logistics system in a goods packaging operation of a pre-shipment operation of a producer operation illustrated in FIG. 3.

FIG. 4 is a data flow diagram illustrating an operation of the logistics system in a goods packaging operation of a pre-shipment operation of the producer operation illustrated in FIG. 3. Reference numeral 210-1 of FIG. 11 is assumed to be a first page provided by the application 210 of FIG. 1, reference numeral 210-2 of FIG. 12 is assumed to be a second page provided by the application 210 of FIG. 1, and each of the first page 210-1 and the second page 210-2 is assumed to be one page or a set of two pages.

Referring to FIGS. 1 to 4 and 11, a first worker is assumed to perform pre-shipment operation S100 and shipment operation S200 of the producer operation using the first portable reader 200-1.

The first worker selects the goods packaging GUI (AGUI1) indicating the first event on the first page 210-1 by using the application 210 executed in the first portable reader 200-1 (S110).

A first event selection signal is generated according to the selection of the first event, and the application 210 activates the information acquisition device 220 in response to the first event selection signal (S112).

When the first worker acquires (e.g., shooting with a camera or scanning with a barcode scanner) goods information (GI, for example, a barcode corresponding to the name of the goods) about the goods 300 from the barcode 310 attached to the goods 300 using the information acquisition device 220, the acquired goods information (GI) is transmitted to the application 210.

The first worker selects a goods deposit type (GDT; for example, refrigerated or frozen) in the fifth GUI (AGUI5) of the first page 210-1 by using the application 210 executed in the first portable reader 200-1 (S116). A goods deposit type (GDT) may be set for each of the first and second compartments.

After the goods 300 are stored in the cold container 420, when the first worker selects the mapping GUI (AGUI6) of the first page 210-1, and tags or scans the data logger 420 with the first portable reader 200-1 (S117), the application 210 generates a first request signal (REQj, j=1) in response to selection of the mapping GUI (AGUI6), and transmits the first request signal (REQ1) to the data logger 420 through the first communication device 230.

The MCU 421 receives the first request signal (REQ1) through the NFC module 443 or the RFID module 447, reads the electronic product code (CODE) from the memory device 423 in response to the first request signal (REQ1) and transmits CODE to the first communication device 230 through the NFC module 443 or the RFID module 447 (S118). The electronic product code (CODE) includes a header, a company code (EPC manager), a goods code (object class), and a serial number.

After the first portable reader 200-1 receives the electronic product code (CODE) (S118), when the first worker selects the transmission GUI (AGUI7) of the first page 210-1 (this is also referred to as 'click') (S120), the application 210 generates the first location information (PI1) of the first portable reader 200-1 in response to the selection of the transmission GUI (AGUI7), generates a first transmission time (TT1) corresponding to time at which the first event log information (ELI1) is transmitted to the server 500, and generates the first event log information (ELI1) and transmits the EL1 to the server 500 through the second communication device 240 (S122).

Each transmission time (STIa, STIb, and TT1TT5), regardless of whether the server 500 actually has received the corresponding log information (NLI, ABLI, and ELli), may mean time (e.g., year, month, day, hour, minute, second) at which each of the devices 420 and 200 has generated and transmitted to the server 500 the corresponding log information (NLI, ABLI, and ELli).

This is to accurately record the time at which the corresponding log information (NLI, ABLI, and ELli) is generated in the server 500 even if each device 420, and 200 fails to transmit the corresponding log information (NLI, ABLI, and ELli) to the server 500 in a timely manner for the reason of being in a shadow blind spot of communication.

The first event log information (ELI1) includes goods information (GI), goods deposit type (GDT), electronic product code (CODE), first location information (PI1) of the first portable reader 200-1, first transmission time (TT1), and first worker information (W1I). Each worker information (W1I, W2I, or W3I) is login information used when each worker logs in to the application 210 of the portable reader 200-1, 200-2, or 200-3.

The server 500 receives the first event log information (ELI1) and stores it in the accessible database 510 (S124).

FIG. 5 is a data flow diagram illustrating a process of setting the configuration information in the data logger equipped in the cold container in the pre-shipment operation of the producer operation illustrated in FIG. 3.

When the first worker selects the setting GUI (AGUI8) on the first page 210-1 by using the application 210 executed in the first portable reader 200-1 (S130), the application 210 activates the second page 210-2 in response to the selection of the setting GUI (AGUI8).

The first worker inputs the data logger start time (STT; for example, 2021.09.15, 9:00 am) in the data logger start time input window (SGUI2) of the second page 210-2, inputs the data logger sensing period (SP; for example, 30 minutes) in the data logger sensing period input window (SGUI3), and inputs at least one threshold value (THV) in the threshold value input window (SGUI4) (S132).

The at least one threshold value (THV) includes a first threshold value (THV1) and a second threshold value (THV2). When the third sensor 437 is a sensor which senses gravitational acceleration and a rotation angle, the first threshold value (THV1) is the gravitational acceleration, and the second threshold value (THV2) is the rotation angle (e.g., left-right rotation angle based on the moving direction).

When the transportation means 600 mounted with the cold container 400 rapidly passes through a speed bump or rapidly rotates in a specific direction at an intersection, the third sensor 437 senses a change in gravitational acceleration and/or a change in rotation angle applied to the data logger 420.

After the configuration information (STT, SP, and THV) is input to the second page 210-2 (S132), when the first worker selects the setup (SGUI5) of the second page 210-2 and tags or scans the data logger 420 with the first portable reader 200-1 (S133), the application 210 transmits the configuration information (ST, SP, and THV) to the data logger 420 through the first communication device 230 (S134).

When the first communication device 230 is an NFC transceiver, the MCU 421 receives the configuration information (STT, SP, and THV) through the second antenna 445, the NFC module 443, and the second interface (IF2) and stores the configuration information (STT, SP, and THV) in the memory device 423 (S134).

When the first communication device 230 is an RFID transceiver, the MCU 421 receives the configuration information (STT, SP, and THV) through the third antenna 449, the RFID module 447, and the second interface (IF2) and stores the configuration information (STT, SP, and THV) in the memory device 423 (S134).

The data logger 420 may further include a discrimination circuit 457 connected between the antennas 445 and 449 and the communication module 443 and 447, the discrimination circuit 457 may determine whether the input signals (STT, SP, and THV) are signals according to the NFC protocol or the signals according to the RFID protocol, activate the NFC module 443 and deactivate the RFID module 447 when the input signals (STT, SP, and THV) are signals according to the NFC protocol, and deactivate the NFC module 443 and activate the RFID module 447 when the input signals (STT, SP, and THV) are signals according to the RFID protocol.

For example, when the input signals (STT, SP, and THV) are signals according to the NFC protocol, the discrimination circuit 457 may supply the output voltage of the power supply 451 to the NFC module 443 and may not supply to the RFID module 447. Further, when the input signals (STT, SP, and THV) are signals according to the RFID protocol, the discrimination circuit 457 may not supply the output voltage of the power supply 451 to the NFC module 443, but to the RFID module 447.

FIG. 6 is a flowchart illustrating a process in which the data logger illustrated in FIG. 1 transmits log information to a server.

Referring to FIGS. 5 and 6, after the data logger start time (STT), the data logger 420 generates the normal log information (NLI) or abnormal log information (ABLI) whenever a set condition (S314 or S320) is satisfied, and transmits to the server 500 through the modem and GPS module 439 and the first antenna 441 (S300).

When the measured value (or sensed value, MV) is not greater than the threshold value (THV) (NO in S320), the normal log information (NLI) generated for each sensing period (SP) includes an electronic product code (CODE), a temperature information (SEIa) corresponding to the internal temperature of the cold container 400, the location information (RPIa) of the data logger 420, and a transmission time information (STIa) at which the normal log information (NLI) is transmitted to the server 500.

However, abnormal log information (ABLI) generated whenever the measured value (MV) is greater than the threshold value (THV) regardless of the sensing period (SP) includes an electronic product code (CODE), temperature information (SEIb) corresponding to the internal temperature of the cold container 400, location information (RPIb) of the data logger 420, and transmission time information (STIb) at which abnormal log information (ABLI) is transmitted to the server 500.

The MCU 421 calculates the current time (CT) using a timer (e.g., a software timer or a hardware timer). For example, the time of the timer may be synchronized with time information included in GPS signals (GPSS) transmitted from the modem and GPS module 439.

The MCU 421 determines whether the current time (CT) is the data logger start time STT (S312). When the current time (CT) is not the data logger start time STT (NO in S312), the MCU 421 performs operation S312.

When the current time (CT) is the data logger start time STT (YES in S312), the MCU 421 performs following operations (i to vi) to transmit the normal log information (NLI) to the server 500 (S316).
  (i) Generate first temperature information (SEIa) from a first output signal of the temperature sensor 453 and/or 455;
  (ii) generate the first location information (RPIa) of the data logger 420 by using the first GPS signals (GPSS) output from the modem and the GPS module 439;
  (iii) read the electronic product code (CODE) stored in the memory device 423;
  (iv) generate the first transmission time information (STIa) at which the normal log information (NLI) is transmitted to the server 500;
  (v) generate the normal log information (NLI) including the electronic product code (CODE), the first temperature information (SEIa), the first location information (RPIa), and the first transmission time information (STIa); and
  (vi) transmit the normal log information (NLI) to the server 500 through the modem and GPS module 439 and the first antenna 441.

The MCU 421 determines whether the current time (CP) is the data logger sensing period (SP) (S314).

Whenever the current time (CP) is the data logger sensing period (SP) (YES in S314, for example, every 30 minutes), the MCU 421 performs operation S316.

However, when the current time (CP) is not the data logger sensing period (SP) (NO in S314), the MCU 421 measures the current value (MV) based on the output signal of the third sensor 437, and compare the measured current value (MV) and the threshold value (S320).

When the measured current value (MV) is the gravitational acceleration, the MCU 421 compares the measured gravitational acceleration MV with the first threshold value (THV1), and when the measured current value (MV) is the rotation angle, the MCU 421 compares the measured rotation angle MV with the second threshold value (THV2).

When the measured current value (MV) is not greater than the threshold value (THV) (NO in S320), the MCU 421 performs operation S314. For example, when the measured gravitational acceleration is not greater than the first threshold value (THV1) and the measured rotation angle is not greater than the second threshold value (THV2), the MCU 421 performs operation S314.

However, when the measured current value (MV) is greater than the threshold value (THV) (YES in S320), for example, when the measured gravitational acceleration is greater than the first threshold value (THV1) or the measured rotation angle is greater than the second threshold value (THV2), the MCU 421 performs the following operations (a~f) to transmit the abnormal log information (ABLI) to the server 500 even if the current time (CP) is not the data logger sensing period (SP) (S322).
  (a) Generate second temperature information (SEIb) from a second output signal of the temperature sensor 453 and/or 455;
  (b) generate second location information (RPIb) of the data logger 420 using the second GPS signals (GPSS) output from the modem and GPS module 439;
  (c) read the electronic product code (CODE) stored in the memory device 423, (d) generate second transmission time information (STIb) at which abnormal log information (ABLI) is transmitted to the server 500;

(e) generate abnormal log information (ABLI) including electronic product code (CODE), second temperature information (SEIb), second location information (RPIb), and second transmission time information (STIb);

(f) transmit the abnormal log information (ABLI) to the server 500 through the modem and GPS module 439 and the first antenna 441.

Figure 7:
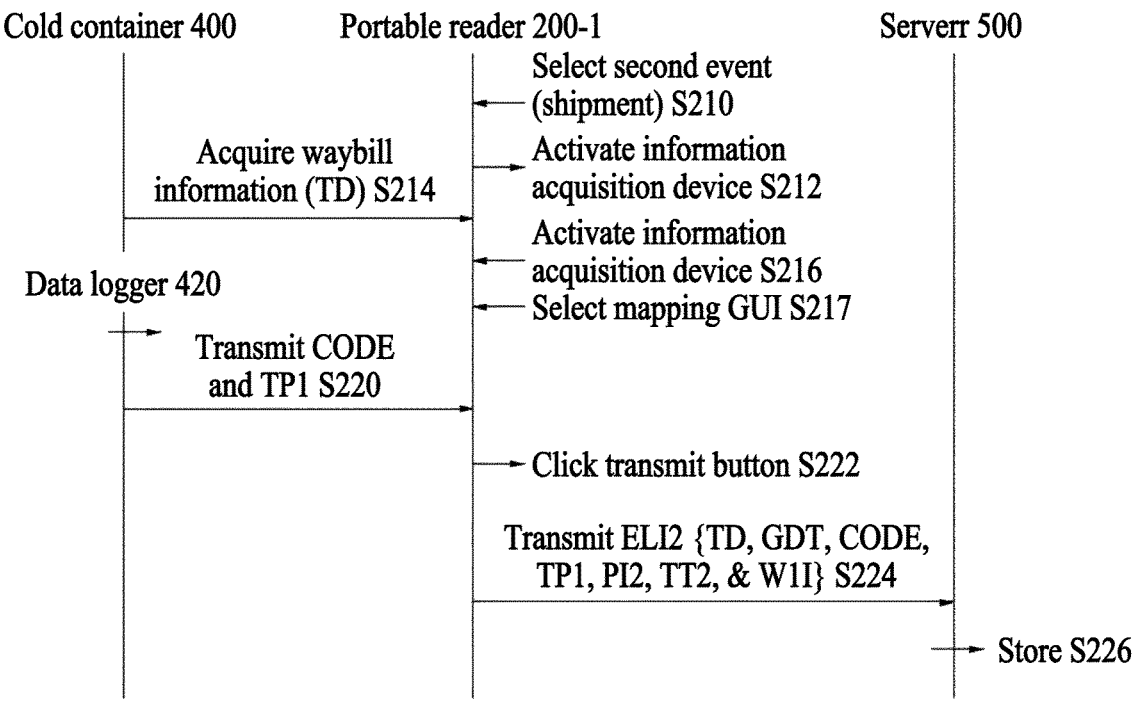
FIG. 7 is a data flow diagram illustrating an operation of the logistics system in a shipment operation of the producer operation illustrated in FIG. 3.

FIG. 7 is a data flow diagram illustrating the operation of the logistics system in the shipment operation of the producer operation illustrated in FIG. 3.

Referring to FIGS. 1, 3, 7, and 11, the first worker selects the shipment GUI (AGUI2) indicating the second event on the first page 210-1 by using the application 210 executed in the first portable reader 200-1 (S210).

When the second event selection signal is generated as the second event is selected, the application 210 activates the information acquisition device 220 in response to the second event selection signal (S212).

When the first worker acquires (e.g., by shooting with a camera or scanning with a barcode scanner) waybill information (TD, for example, barcode) from the waybill 410 attached to the cold container 400 using the information acquisition device 220, the acquired waybill information (TD) is transmitted to the application (S214).

The first worker selects a goods deposit type (GDT; for example, refrigerated or frozen) in the fifth GUI (AGUI5) of the first page 210-1 by using the application 210 executed in the first portable reader 200-1 (S216).

If the goods deposit type (GDT) is selected in operation S116 of FIG. 4, operation S216 may be omitted. However, if the goods deposit type (GDT) is not selected in operation S116 of FIG. 4, operation S216 needs to be performed.

When the first worker selects the mapping GUI (AGUI6) of the first page 210-1 and tags or scans the data logger 420 with the first portable reader 200-1 (S217), the application 210 of the first portable reader 200-1 generates and transmits a second request signal (REQj, i=2) to the first communication device 230.

The MCU 421 receives the second request signal (REQ2) transmitted from the first communication device 230 through the NFC module 443 or the RFID module 447, and finally measures (or calculates) the first temperature (TPk, k=1) by using the output signal of the temperature sensors 453 and/or 455 in response to the second request signal (REQ2) (S218).

When the MCU 421 finally reads the electronic product code (CODE) from the memory device 423 in response to the second request signal (REQ2), and transmits the electronic product code (CODE) and the first temperature (TP1) to the first communication device 230 of the first portable reader 200-1 through the NFC module 443 the RFID module 447 (S220), the application 210 of the first portable reader 200-1 receives the electronic product code (CODE) and the first temperature (TP1) through the first communication device 230 (S220).

When the first worker selects the transmission GUI (AGUI7) of the first page 210-1 (S222), the application 210 generates the second location information (PI2) of the first portable reader 200-1 in response to the selection of the transmission GUI (AGUI7), generates a second transmission time (TT2) at which the second event log information (ELI2) is transmitted, and generates and transmits to the server 500 the second event log information (ELI2) through the second communication device 240 of the first portable reader 200-1 (S224).

The second event log information (ELI2) includes waybill information (TD), goods deposit type (GDT), electronic product code (CODE), first temperature (TP1), second location information (PI2), second transmission time (TT2), and the first worker information (W1I).

The server 500 stores the second event log information ELI2 in the accessible database 510 (S226).

Figure 8:
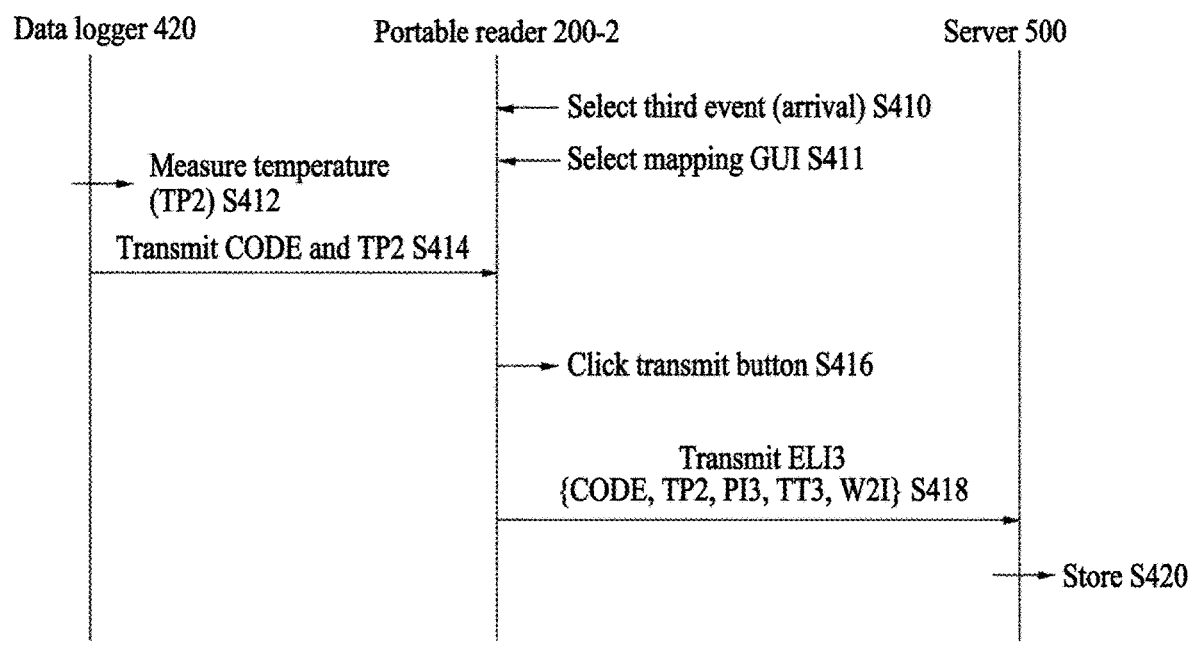
FIG. 8 is a data flow diagram illustrating an operation of the logistics system in an arrival operation of a delivery logistics center illustrated in FIG. 3.

FIG. 8 is a data flow diagram illustrating the operation of the logistics system in the arrival operation of a delivery logistics center illustrated in FIG. 3.

After the shipment operation S200 of the producer operation is completed, the transportation means 600 mounted with the cold container 400 arrives at the delivery logistics center through the moving process (S300).

Figure 9:
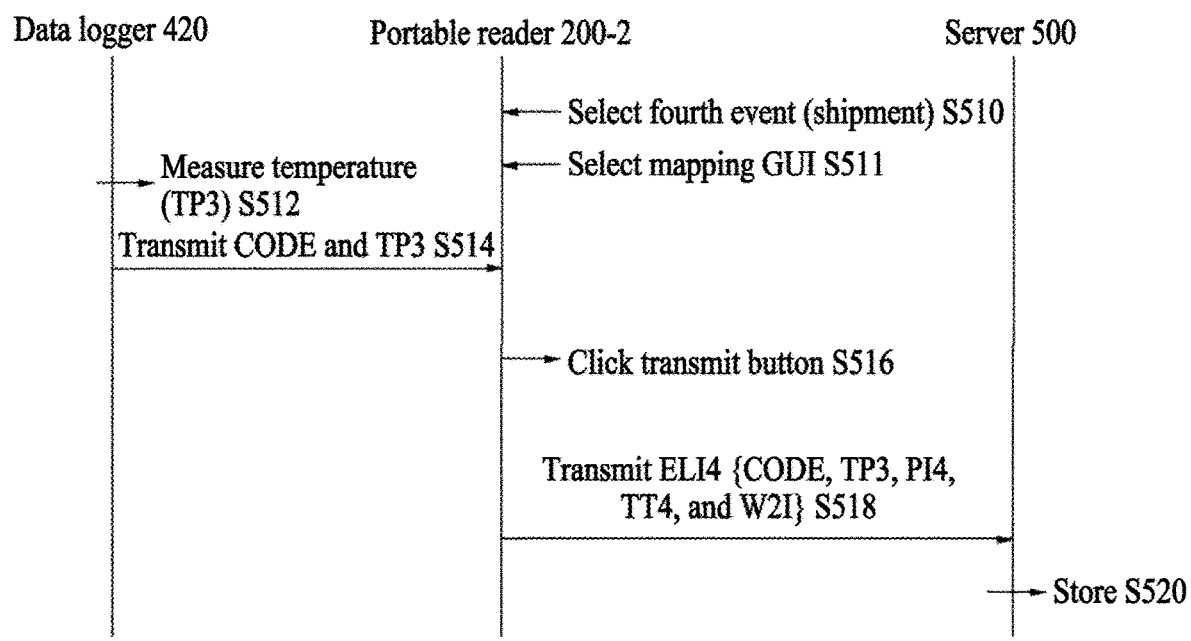
FIG. 9 is a data flow diagram illustrating an operation of the logistics system in a shipment operation of the delivery logistics center illustrated in FIG. 3.

Referring to FIGS. 1, 2, 3, 8, and 11, the second worker is assumed to perform arrival operation S400 of FIG. 8 and shipment operation S500 of FIG. 9 using the second portable reader 200-2.

The second worker selects the arrival GUI (AGUI3) indicating the third event on the first page 210-1 by using the application 210 executed in the second portable reader 200-2 (S410).

When the second worker selects the mapping GUI (AGUI6) of the first page 210-1 and tags or scans the data logger 420 with the first portable reader 200-1 (S411), the application 210 generates and transmits a third request signal (REQj, j=3) to the first communication device 230 of the second portable reader 200-2.

The MCU 421 receives the third request signal (REQ3) output from the first communication device 230 of the second portable reader 200-2 through the NFC module 443 or the RFID module 447, and finally measures (or calculates) the second temperature (TPk, k=2) using the output signals of the temperature sensors 453 and/or 455, in response to the third request signal (REQ3) (S412).

When the MCU 421 reads the electronic product code (CODE) stored in the memory device 423 in response to the third request signal (REQ3), and transmits the electronic product code (CODE) and the second temperature (TP2) to the first communication device 230 of the second portable reader 200-2 through the NFC module 443 or the RFID module 447 (S414), the application 210 of the second portable reader 200-2 receives the electronic product code (CODE) and the second temperature (TP2) through the first communication device 230 (S414).

When the second worker selects the transmission GUI (AGUI7) of the first page 210-1 (S416), the application 210 of the second portable reader 200-2 generates third location information (PI3) of the second portable reader 200-2 in response to the selection of the transmission GUI (AGUI7), generates a third transmission time (TT3) indicating the time at which the third event log information (ELI3) is transmitted to the server 500, and generates and transmits to the server 500 the third event log information (ELI3) through the second communication device 240 of the second portable reader 200-2 (S418).

The third event log information (ELI3) includes an electronic product code (CODE), a second temperature (TP2), a third location information (PI3), a third transmission time (TT3), and a second worker information (W2I).

The server 500 receives and stores the third event log information (ELI3) and in the accessible database 510 (S420).

FIG. 9 is a data flow diagram illustrating the operation of the logistics system in the shipment operation of the delivery logistics center illustrated in FIG. 3.

The second worker selects the shipment GUI (AGUI2) indicating the fourth event on the first page 210-1 by using the application 210 executed in the second portable reader 200-2 (S510).

When the second worker selects the mapping GUI (AGUI6) of the first page 210-1 and tags or scans the data logger 420 with the second portable reader 200-2 (S511), the application 210 of the second portable reader 200-2 generates and transmits a fourth request signal (REQj, j=4) to the first communication device 230.

The MCU 421 receives the fourth request signal (REQ4) output from the first communication device 230 of the second portable reader 200-2 through the NFC module 443 or the RFID module 447, and finally measures (or calculates) the third temperature (TPk, k=3) by using the output signal of the temperature sensor 453 and/or 455 in response to the fourth request signal (REQ4) (S512).

When the MCU 421 reads the electronic product code (CODE) stored in the memory device 423 in response to the fourth request signal (REQ4), and transmits the electronic product code (CODE) and the third temperature (TP3) to the first communication device 230 of the second portable reader 200-2 through the NFC module 443 or the RFID module 447 (S514), the application 210 of the second portable reader 200-2 receives the electronic product code (CODE) and the third temperature (TP3) through the first communication device 230 (S514).

When the second worker selects the transmission GUI (AGUI7) of the first page 210-1 (S516), the application 210 generates fourth location information (PI4) of the second portable reader 200-2 in response to the selection of the transmission GUI (AGUI7), generates a fourth transmission time (TT4) indicating the time at which the fourth event log information (ELI4) is transmitted to the server 500, and generates and transmits to the server 500 the fourth event log information (ELI4) through the second communication device 240 of the second portable reader 200-2 (S518).

The fourth event log information (ELI4) includes an electronic product code (CODE), a third temperature (TP3), a fourth location information (PI4), a fourth transmission time (TT4), and a second worker information (W2I).

The server 500 stores the fourth event log information (ELI4) in the accessible database 510 (S520).

Figure 10:
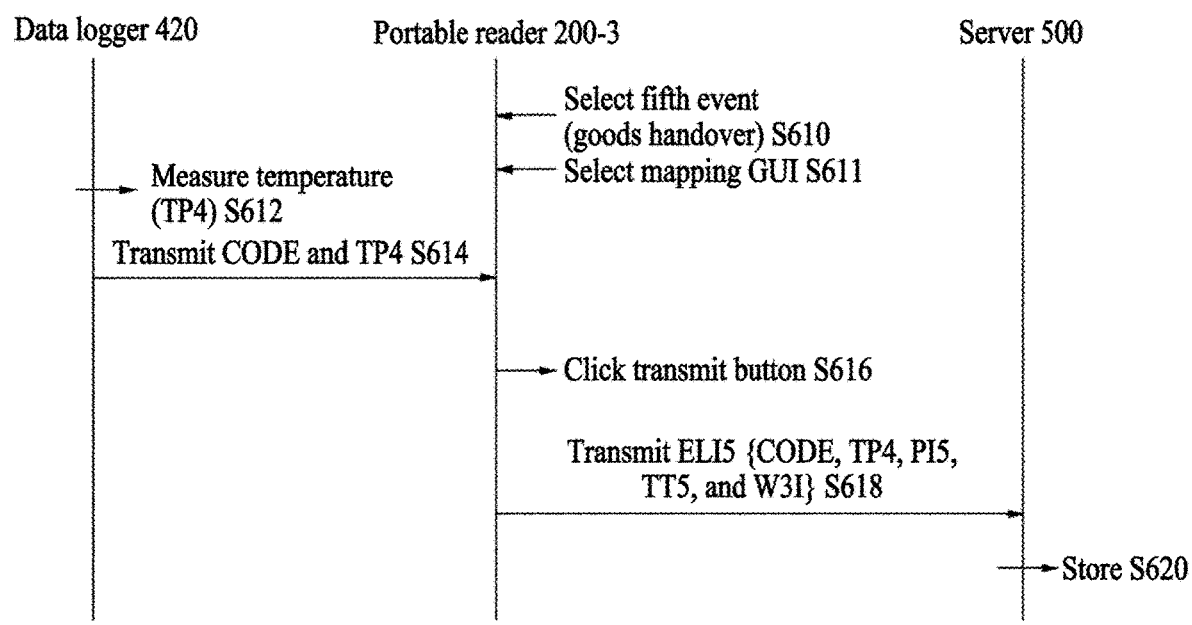
FIG. 10 is a data flow diagram illustrating an operation of the logistics system in a goods handover operation of a consumer operation illustrated in FIG. 3.

FIG. 10 is a data flow diagram illustrating the operation of the logistics system in the goods handover operation of the consumer operation illustrated in FIG. 3.

After the shipment operation S500 of the delivery logistics center is completed, the transportation means 600 mounted with the cold container 400 is delivered to the consumer through the moving process (S300).

Referring to FIGS. 1, 2, 3, 9, and 11, the third worker is assumed to perform goods handover (S600) using the third portable reader 200-3. The holder of the third portable reader 200-3 is assumed to be a driver of the transportation means 600.

The third worker selects the goods handover GUI (AGUI4) indicating the fifth event on the first page 210-1 by using the application 210 executed in the third portable reader 200-3 (S610).

When the third worker selects the mapping GUI (AGUI6) of the first page 210-1 and tags or scans the data logger 420 with the third portable reader 200-3 (S611), the application 210 of the third portable reader 200-3, generates and transmits a fifth request signal (REQj, j=5), to the first communication device 230 of the third portable reader 200-3.

The MCU 421 receives the fifth request signal (REQ5) output from the first communication device 230 of the third portable reader 200-3 through the NFC module 443 or the RFID module 447, and finally measures (or calculates) the fourth temperature (TPk, k=4) by using the output signal of the temperature sensor 453 and/or 455 in response to the fifth request signal (REQ5) (S612).

When the MCU 421 reads the electronic product code (CODE) stored in the memory device 426 in response to the fifth request signal (REQ5), and transmits the electronic product code (CODE) and the fourth temperature (TP4) to the first communication device 230 of the third portable reader 200-3 through the NFC module 443 or the RFID module 447 (S614), the application 210 of the third portable reader 200-3 receives the electronic product code (CODE) and the fourth temperature (TP4) through the first communication device 230 (S614).

When the third worker selects the transmission GUI (AGUI7) of the first page 210-1 (S616), the application 210 generates fifth location information (PI5) of the third portable reader 200-3 in response to the selection of the transmission GUI (AGUI7), generates a fifth transmission time (TT5) indicating the time at which the fifth event log information (ELI5) is transmitted to the server 500, and generates and transmits to the server 500 the fifth event log information (ELI5) through the second communication device 240 (S618).

The fifth event log information (ELI5) includes an electronic product code (CODE), a fourth temperature (TP4), a fifth location information (PI5), a fifth transmission time (TT5), and the third worker information (W3I). Each temperature (TP1~TP4) means temperature information.

The server 500 receives and stores the fifth event log information (ELI5) in the accessible database 510 (S620).

FIG. 13 is a diagram illustrating an example embodiment of information displayed on an electronic paper display of the data logger illustrated in FIG. 1.

Referring to FIGS. 1, 2, 3, and 13, the information 425-1 displayed on the electronic paper display 425 includes a unique number of the cold container 400, owner information of the cold container 400, current date, data logger start time (STT), data logger sensing period (SP), event type (packaging, shipment, arrival, or goods handover), current temperature (T1 and/or T2) inside of the cold container 400, the maximum value (T3/T4) and/or the minimum value (T5/T6) of the internal temperature of the cold container 400, and the current voltage and available percentage of the power supply 451.

When the cold container 400 includes a freezer and a refrigerator, T1 is the current temperature (T1) of the freezer, T2 is the current temperature (T2) of the refrigerator, T3 is the maximum temperature of the freezer, T4 is the maximum temperature of the refrigerator, T5 is the minimum temperature of the freezer, and T6 is the minimum temperature of the refrigerator. Each worker may operate the button 427 to display desired information on the electronic paper display 425.

The maximum temperature is the highest temperature among the first temperatures sensed by the temperature sensors 453 and/or 455 every sensing period (SP) and the second temperatures sensed by the temperature sensors 453 and/or 455 whenever the abnormal state occurs, and the minimum temperature is the lowest temperature among the first temperatures and the second temperatures. Each temperature (T1~T6) is stored in the memory device 432 under the control of the MCU 421.

A method of providing logistics information using the data logger 420 equipped in the cold container 400 for storing the goods 300, the first portable reader 200-1, the second portable reader 200-2, and the server 500 includes receiving, by the data logger 420, configuration information including the start time (STT) and the sensing period (SP) of the data logger, and the threshold values (THV1 and THV2) of the gravitational acceleration and rotation angle for the data logger from the first portable reader 200-1, starting, by the data logger 420, operation from the start time (STT), comparing the output values (MV) of the sensor 453 and/or 455 of the data logger 420 with the threshold values (THV1 and THV2), and determining whether an abnormal state occurs in the data logger 420 according to a result of the comparison, generating and transmitting to the server 500, by the data logger 420, the normal log information (NLI) at each of the sensing period (SP) when the abnormal state does not occur in the data logger 420, and generating and transmitting to the server 500, by the data logger 420, the abnormal log information (ABLI) whenever the abnormal state occurs regardless of the sensing period (SP).

The determining of whether the abnormal state occurs is performed by the MCU 421 which determines that the data logger 420 is in the normal state when each of the output values (MV) is less than each of the threshold values (THV1 and THV2) (NO in S320), and determines that the data logger 420 is in the abnormal state when at least one of the output values (MV) is greater than at least one of the threshold values (THV1 and THV2) (YES in S320).

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

What is claimed is:

1. A data logger, including an out-body equipped on an outside of a container body and an in-body equipped on an inside of the container body, comprising:
    a sensor configured to sense a change in a gravitational acceleration of the data logger and a change in a rotation angle of the data logger, and generate a sensing signal;
    a first temperature sensor of the in-body configured to sense an internal temperature of a freezer;
    a second temperature sensor of the in-body configured to sense an internal temperature of a refrigerator;
    a communication module configured to receive configuration information including a sensing period and threshold values of the data logger from a portable reader; and
    a microprocessor unit configured to receive the sensing signal from the sensor, receive the sensing period and the threshold values from the communication module, generate sensing values corresponding to the sensing signal, compare the sensing values with the threshold values, determine whether an abnormal state occurs in the data logger according to a result of the comparison, generate and transmit to a server normal log information at each of the sensing period when the abnormal state does not occur in the data logger, and generate and transmit to the server abnormal log information whenever the abnormal state occurs regardless of the sensing period,
    wherein the microprocessor unit is configured to receive and process an output signal of the first temperature sensor and ignore an output signal of the second temperature sensor,
    wherein the microprocessor unit is configured to determine that the data logger is in a normal state when each of the sensing values is less than each of the threshold values about the change in the gravitational acceleration and the rotation angle, and determine that the data logger is in the abnormal state when at least one of the sensing values is greater than at least one of the threshold values about the change in a gravitational acceleration and the rotation angle.

2. The data logger of claim 1, further comprising:
    a memory device connected to the microprocessor unit and configured to store an electronic product code; and
    a modem and GPS module connected to the microprocessor unit, and configured to receive GPS signals and communicate with the server,
    wherein, at each of the sensing period in the normal state, the microprocessor unit is configured to:
    generate first temperature information using the temperature sensor;
    generate first location information using the GPS signals;
    read the electronic product code stored in the memory device;
    generate first transmission time information at which the normal log information is transmitted to the server; and
    generate and transmit to the modem and GPS module, the normal log information including the electronic product code, the first temperature information, the first location information, and the first transmission time information.

3. The data logger of claim 2, wherein, regardless of the sensing period whenever the abnormal state occurs, the microprocessor unit is configured to:
    generate second temperature information using the temperature sensor;
    generate second location information using the GPS signals;
    read the electronic product code stored in the memory device;
    generate second transmission time information at which the abnormal log information is transmitted to the server; and
    generate and transmit to the modem and GPS module, the abnormal log information including the electronic product code, the second temperature information, the second location information, and the second transmission time information.

4. The data logger of claim 3, wherein the modem and GPS module is configured to transmit the normal log information and the abnormal log information to the server through a low-power wide area network.

5. The data logger of claim 3, wherein
    the communication module is configured to receive a request signal from the portable reader, and
    the microprocessor unit is configured to read the electronic product code from the memory device and transmit the electronic product code to the communication module in response to the request signal.

6. The data logger of claim 3, wherein
the communication module is configured to receive a request signal from the portable reader, and
the microprocessor unit is configured to:
  generate third temperature information using the temperature sensor in response to the request signal;
  read the electronic product code from the memory device in response to the request signal; and
  transmit the third temperature information and the electronic product code to the communication module in response to the request signal.

7. The data logger of claim 3, further comprising:
an electronic paper display device connected to the microprocessor unit,
wherein
the microprocessor unit is configured to display time at which the data logger starts to operate, the sensing period, and a current temperature, a maximum temperature, and a minimum temperature sensed by the temperature sensor on the electronic paper display device, and
the maximum temperature is the highest temperature among first temperatures sensed by the temperature sensor at each of the sensing period and second temperatures sensed by the temperature sensor whenever the abnormal state occurs, and
the minimum temperature is the lowest temperature among the first temperatures and the second temperatures.

8. The data logger of claim 3, wherein
the communication module comprises an NFC module and an RFID module, and
the data logger further comprises a discrimination circuit configured to activate the NFC module when the configuration information transmitted from the portable reader is configuration information according to an NFC protocol, and activate the RFID module when the configuration information transmitted from the portable reader is configuration information according to an RFID protocol.

9. A method of operating a data logger, including an out-body equipped on an outside of a container body and an in-body equipped on an inside of the container body, the method comprising:
sensing a change in a gravitational acceleration of the data logger and a change in a rotation angle of the data logger and generating a sensing signal, by the data logger;
sensing an internal temperature of a freezer using a first temperature sensor of the in-body, by the data logger;
sensing an internal temperature of a refrigerator using a second temperature sensor of the in-body, by the data logger;
receiving, by the data logger, configuration information including a sensing period and threshold values of the data logger from a portable reader;
receiving the sensing signal and receiving the configuration information including the sensing period and the threshold values, by the data logger;
receiving and processing an output signal of the first temperature sensor and ignoring an output signal of the second temperature sensor received;
generating sensing values corresponding to the sensing signal, comparing the sensing values with the threshold values, and determining whether an abnormal state occurs in the data logger according to a result of the comparison, by the data logger;
generating and transmitting to the server, by the data logger, normal log information at each of the sensing period when the abnormal state does not occur in the data logger; and
when the abnormal state occurs in the data logger, generating and transmitting to the server, by the data logger, abnormal log information whenever the abnormal state occurs regardless of the sensing period,
wherein the microprocessor unit is configured to receive and process an output signal of the first temperature sensor and ignore an output signal of the second temperature sensor received,
wherein the microprocessor unit is configured to determine that the data logger is in a normal state when each of the sensing values is less than each of the threshold values about the change in the gravitational acceleration and the rotation angle, and determine that the data logger is in the abnormal state when at least one of the sensing values is greater than at least one of the threshold values about the change in a gravitational acceleration and the rotation angle.

10. A cold container comprising:
a container body; and
a data logger comprising an out-body equipped on an outside of the container body and an in-body equipped on an inside of the container body,
wherein the in-body comprises:
  a first temperature sensor of the in-body configured to sense an internal temperature of a freezer; and
  a second temperature sensor of the in-body configured to sense an internal temperature of a refrigerator,
wherein the out-body comprises:
  a sensor configured to sense a change in a gravitational acceleration of the data logger and a change in a rotation angle of the data logger, and generate a sensing signal;
  a communication module configured to receive configuration information including a sensing period and threshold values of the data logger from a portable reader; and
a microprocessor unit, and
wherein the microprocessor unit is configured to:
  receive the sensing signal from the sensor;
  receive the sensing period and the threshold values from the communication module;
  generate sensing values corresponding to the sensing signal;
  compare the sensing values with the threshold values to determine whether an abnormal state occurs in the data logger according to a result of the comparison;
  generate and transmit to the server, normal log information at each of the sensing period when the abnormal state does not occur in the data logger; and
  when the abnormal state occurs in the data logger, generate and transmit to the server, abnormal log information whenever the abnormal state occurs regardless of the sensing period
  wherein the microprocessor unit is configured to receive and process an output signal of the first temperature sensor and ignore an output signal of the second temperature sensor,
  wherein the microprocessor unit is configured to determine that the data logger is in a normal state when each of the sensing values is less than each of the threshold values about the change in the gravitational acceleration and the rotation angle, and determine that the data logger is in the abnormal state when at least one of the sensing values is greater than at least one of the threshold values about the change in a gravitational acceleration and the rotation angle.

11. The cold container of claim 10, wherein
the in-body comprises a temperature sensor connected to the microprocessor unit,
the out-body further comprises:
  a memory device connected to the microprocessor unit and configured to store an electronic product code; and
  a modem and GPS module connected to the microprocessor unit and configured to receive GPS signals and communicate with the server, and
at each of the sensing period in the normal state, the microprocessor unit is configured to:
  generate first temperature information using the temperature sensor;
  generate first location information using the GPS signals;
  read the electronic product code stored in the memory device;
  generate first transmission time information at which the normal log information is transmitted to the server; and
  generate and transmit to the modem and GPS module, the normal log information including the electronic product code, the first temperature information, the first location information, and the first transmission time information.

12. The cold container of claim 11, wherein, regardless of the sensing period whenever the abnormal state occurs, the microprocessor unit is configured to:
  generate second temperature information using the temperature sensor;
  generate second location information using the GPS signals;
  read the electronic product code stored in the memory device;
  generate second transmission time information at which the abnormal log information is transmitted to the server; and
  generate and transmit to the modem and GPS module, the abnormal log information including the electronic product code, the second temperature information, the second location information, and the second transmission time information.

13. The cold container of claim 12, wherein the modem and GPS module is configured to transmit the normal log information and the abnormal log information to the server through a low-power wide area network.

14. The cold container of claim 12, further comprising:
an electronic paper display device connected to the microprocessor unit,
wherein
  the microprocessor unit is configured to display time at which the data logger starts to operate, the sensing period, and a current temperature, a maximum temperature, and a minimum temperature sensed by the temperature sensor on the electronic paper display device, and
  the maximum temperature is the highest temperature among first temperatures sensed by the temperature sensor at each of the sensing period and second temperatures sensed by the temperature sensor whenever the abnormal state occurs, and
  the minimum temperature is the lowest temperature among the first temperatures and the second temperatures.

15. A non-transitory computer-readable storage medium of a portable reader configured to control an operation of a data logger equipped in a cold container, storing an application that, when executed by a processor, cause the processor to perform:
  activating an information acquisition device of the portable reader in response to a first event selection signal;
  from the information acquisition device configured to acquire waybill information from a waybill for goods attached to the cold container, receiving the waybill information;
  receiving a goods deposit type indicating whether the goods stored in the cold container are to be stored refrigerated or frozen;
  transmitting a first request signal to the data logger through a first communication device of the portable reader;
  when the data logger measures a first internal temperature of the cold container in response to the first request signal, receiving first temperature information corresponding to the first internal temperature and an electronic product code of the cold container from the data logger; and
  in response to a first transmission request, generating and transmitting first event log information including the waybill information, the goods deposit type, the electronic product code, the first temperature information, and first location information of the portable reader to a server through a second communication device of the portable reader,
wherein the first event log information further includes first time information indicating time at which the first event log information is transmitted to the server
wherein the data logger is configured to receive and process an output signal of a first temperature sensor that sense an internal temperature of a freezer and ignore an output signal of a second temperature sensor sense an internal temperature of a refrigerator,
wherein the data logger is configured to determine that the data logger is in a normal state when each of the sensing values is less than each of the threshold values about the change in the gravitational acceleration and the rotation angle, and determine that the data logger is in the abnormal state when at least one of the sensing values is greater than at least one of the threshold values about the change in a gravitational acceleration and the rotation angle.

16. The non-transitory computer-readable storage medium of claim 15, wherein the application that, when executed by a processor, cause the processor to performs:
  receiving a second event selection signal;
  transmitting a second request signal to the data logger through the first communication device;
  when the data logger measures a second internal temperature of the cold container in response to the second request signal, receiving second temperature information corresponding to the second internal temperature and the electronic product code from the data logger; and
  in response to a second transmission request, generating and transmitting second event log information including the electronic product code, the second temperature information, and second location information of the portable reader to the server through the second communication device, wherein the second event log information further includes second time information indicating time at which the second event log information is transmitted to the server.

17. The non-transitory computer-readable storage medium of claim 15, wherein the application that, when executed by a processor, cause the processor to further performs:

receiving a start time indicating an operation start time of the data logger, a sensing period indicating when the data logger generates log information and when to transmit the generated log information to the server, and a threshold value of a sensor; and in response to a second request signal, transmitting the start time, the sensing period, and the threshold value to the data logger, wherein the threshold value is a threshold value of a sensor configured to sense a gravitational acceleration and a rotation angle of the data logger.

\* \* \* \* \*